US 9,712,095 B2

(12) United States Patent
Bönke et al.

(10) Patent No.: US 9,712,095 B2
(45) Date of Patent: Jul. 18, 2017

(54) EFFICIENT DAMPING OF VIBRATIONS OF AN ELECTRIC MACHINE

(71) Applicant: SIEMENS AKTIENGESELLSCHAFT, München (DE)

(72) Inventors: Daniel Bönke, Nürnberg (DE); Michael Jäntsch, Erlangen (DE); Stefan Künzel, Erlangen (DE); Carsten Spindler, Remptendorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 45 days.

(21) Appl. No.: 14/943,860

(22) Filed: Nov. 17, 2015

(65) Prior Publication Data
US 2016/0141993 A1 May 19, 2016

(30) Foreign Application Priority Data

Nov. 18, 2014 (EP) .................................. 14193658

(51) Int. Cl.
*H02P 25/024* (2016.01)
*H02P 21/05* (2006.01)
*H02P 25/06* (2016.01)

(52) U.S. Cl.
CPC ............ *H02P 21/05* (2013.01); *H02P 25/024* (2016.02); *H02P 25/06* (2013.01)

(58) Field of Classification Search
CPC .............................. H02P 21/05; H02P 25/024
See application file for complete search history.

(56) References Cited

U.S. PATENT DOCUMENTS 3,612,970 A * 10/1971 Sofan ................... H02P 25/024
318/721
4,511,834 A * 4/1985 Studtmann ............ H02P 25/024
318/700

(Continued)

FOREIGN PATENT DOCUMENTS

DE 19519238 A1 1/1996
DE 101 50 318 4/2003

(Continued)

OTHER PUBLICATIONS

Blaabjerg F. et al: "A sensorless, stable v/f control method for permanent-magnet synchronous motor drives"; IEEE Transactions on Industry Applications; IEEE Service Center; Piscataway, NJ. US; Bd. 39; Nr. 3; May 1, 2003 (May 1, 2003); pp. 783-791, XP011096858; ISSN: 0093-9994, DOI:10.1109/TIA.2003.81062; 2003; (2015Q07840).

*Primary Examiner* — Shawki S Ismail
*Assistant Examiner* — Muhammad S Islam
(74) *Attorney, Agent, or Firm* — Henry M. Feiereisen LLC

(57) ABSTRACT

A first active part of a poly-phase electric machine is connected to a converter having a control facility. The control facility updates a base commutation angle using the target speed value and determines direct-axis and quadrature-axis component values of currents and a commutation angle supplied to the machine. Target and component quadrature-axis values are provided to a quadrature-axis portion of a current controller that determines a target value of the quadrature-axis voltage component. Target and component current values are supplied to a direct-axis portion of the current controller, which determines a target value of the direct-axis voltage component therefrom. The target value of the direct-axis and quadrature-axis voltage components and the commutation angle are used to determine the target (Continued)

output voltages provided to the converter. A damping commutation angle determined using target values of the quadrature-axis and direct axis voltage components is used to adjust the of the voltage.

17 Claims, 4 Drawing Sheets

(56) References Cited

U.S. PATENT DOCUMENTS

| | | |
|---|---|---|
| 6,903,529 B2 | 6/2005 | Künzel et al. |
| 7,024,332 B2 | 4/2006 | Künzel et al. |
| 7,047,150 B2 | 5/2006 | Künzel et al. |
| 8,729,845 B2 | 5/2014 | Künzel et al. |
| 2006/0001393 A1* | 1/2006 | Rozman ............... H02P 21/05 318/400.21 |
| 2009/0066360 A1 | 3/2009 | Künzel et al. |
| 2013/0200839 A1* | 8/2013 | Schramm ............. H02P 21/05 318/702 |
| 2014/0026681 A1 | 1/2014 | Köpken et al. |

FOREIGN PATENT DOCUMENTS

| | | |
|---|---|---|
| DE | 101 50 319 | 5/2003 |
| DE | 10 2008 008 602 | 7/2010 |
| WO | WO 2011107773 A2 | 9/2011 |

* cited by examiner

EFFICIENT DAMPING OF VIBRATIONS OF AN ELECTRIC MACHINE

CROSS-REFERENCES TO RELATED APPLICATIONS

This application claims the priority of European Patent Application, Serial No. 14193658.3, filed Nov. 18, 2014, pursuant to 35 U.S.C. 119(a)-(d), the disclosure of which is incorporated herein by reference in its entirety as if fully set forth herein.

BACKGROUND OF THE INVENTION

The present invention is directed to a method and computer apparatus for efficiently damping vibrations in an electric machine. More particularly, the invention is directed to efficiently damping vibrations in an electric machine having a three-phase power supply.

Control methods for electric machines are known in various embodiments. A so-called regulated operation is in particular known for instance for electric synchronous machines. During regulated operation, the first active part is applied with a quadrature-axis component of current, which is precisely sufficient to cause a movement of the second active part of the electric machine relative to the first active part on account of the quadrature-axis component of current. Regulated operation is required for instance for linear drives in DE 101 50 318 A1 and DE 101 50 319 C1. Regulated operation is also required in DE 10 2008 008 602 A1.

A so-called controlled operation is further known for synchronous machines. During controlled operation, the first active part is applied with a direct-axis component of current, which is sufficiently large to safely cause the movement of the second active part of the electric machine relative to the first active part. The quadrature-axis component of current is kept as low as possible or is controlled by specifying a corresponding target quadrature-axis component of current value. By advancing the direct-axis component of current according to the desired movement, the relative movement of the second active part relative to the first active part follows the magnetic field produced by the direct-axis component of current. During controlled operation, also often referred to as I/f operation in practice, mechanical vibrations may however result, which are overlying the desired relative movement of the second active part relative to the first active part. In many instances, a damping of such Reference is made purely by example to DE 195 19 238 A1.

However, the methods and apparatus that are known in the art do not reliably provide vibration damping over the entire speed range of the apparatus. A means and method that efficiently damps vibration generated during relative movement of components over their entire speed range is readily provided in accordance with the invention.

SUMMARY OF THE INVENTION

The present invention provides a method and apparatus that conveniently provides efficient and reliable damping of the vibrations produced in the second active part relative to the first active part of the electric machine during controlled operation. Advantageously, an existing control facility can be easily retrofitted by providing operating software to operate its control facility in accordance with the invention.

In accordance with the invention, a first active part of an electric machine is connected to a supply voltage by means of a converter so that the first active part is supplied with electric current by a three-phase power-supply system. A predefined target speed value is supplied to a control facility controlling the converter. The control facility updates a base commutation angle using the target speed value, and determines a direct-axis component and a quadrature-axis component of the current using the electric currents and a commutation angle used by the three-phase system. The direct-axis and quadrature-axis components of the currents are related to a second active part of the electric machine that interacts with the first active part of the electric machine. The control facility supplies a target quadrature-axis component of the current value and the quadrature-axis component of the current to a quadrature-axis component of the current controller that determines a target quadrature-axis component of the voltage value therefrom. The control facility supplies a target direct-axis component of the current value and the direct-axis component of current to a direct-axis component of current controller that determines a target direct-axis component of voltage value therefrom. The control facility determines data characteristic of voltages of a three-phase voltage system using the target direct-axis component of voltage value, the target quadrature-axis component of voltage value and the commutation angle. That characteristic data is output by the converter to the first active part of the electric machine and to the converter. The control facility determines a commutation angle using the base commutation angle and a damping commutation angle.

According to a further aspect of the present invention, a computer program includes machine code that is adapted to be processed by a control facility of a converter, the processing of the machine code by the control facility causing the control facility to control the converter in accordance with the control method of the invention.

According to a further aspect of the present invention, provision is made for a control facility adapted to operate a converter in accordance with the method of the invention, and an electric machine. An electric machine in accordance with the invention has a first active part connected to a supply voltage by means of a converter so that the first active part is supplied with electric currents from a three-phase system, and the converter is controlled by a control facility in accordance with the invention.

According to an advantageous feature of the present invention, a control method of the type described above is implemented so that the control facility determines a damping commutation angle using both the target direct-axis component of the voltage value and also the target value of the quadrature-axis component of the voltage.

According to another advantageous feature of the present invention, the target value of the quadrature-axis component of voltage can be weighted by a first coefficient and that weighted value is used to determine a damping commutation angle. In other embodiments, the target value of the quadrature-axis component of the voltage is filtered prior to or after that weighting. In a particular embodiment it is also processed by a band-pass filter.

The target value of the direct-axis component of the voltage can be advantageously weighted using a second coefficient and then integrated. The result of the integration is used to determine a damping commutation angle. The target value of the direct-axis component of the voltage can be filtered prior to the in. In particular, the filter can be a band-pass filter.

The control facility advantageously also uses a target speed value to determine the damping commutation angle. In determining the damping commutation angle, a target speed value weighted by a first characteristic coefficient is subtracted from the target value of the quadrature-axis component of the voltage.

Alternatively, but advantageously in addition, the target value of the direct-axis component of the voltage can be weighted by a second coefficient, divided by the target speed value, and then integrated. The integrated result is then used to determine the damping commutation angle. In this case, the target value of the direct-axis component of voltage is preferably subjected to filtering prior to division by the target speed value.

According to an advantageous feature of the present invention, the control facility can also uses the target value of the quadrature-axis component of the current to determine a damping commutation angle. In particular the control facility may advantageously weight the target value of the quadrature-axis component of the current value using a second characteristic coefficient and subtract the weighted result from the target value of the quadrature-axis component of the voltage.

A target acceleration value can also be predefined and used by the control facility to determine a target value of the quadrature-axis component of the current value using the target acceleration value.

The control method can be used for acceleration of either a rotatory electric machine, or a linear electric drive.

According to another aspect of the present invention, a computer program configured to implement the inventive method described above includes machine code configured to cause the control facility to control a poly-phase converter in accordance with the invention when processed by the control facility.

According to another advantageous feature of the present invention, a control facility in accordance with the invention, includes a computer program which includes machine code configured to cause the control facility to control a poly-phase converter in accordance with the invention when processed by the control facility.

According to another advantageous feature of the present invention, a control facility includes a computer program configured to implement the method in accordance with the invention, when machine code in the program is processed by the control facility, causing the control facility to operate a poly-phase converter in accordance with the invention.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
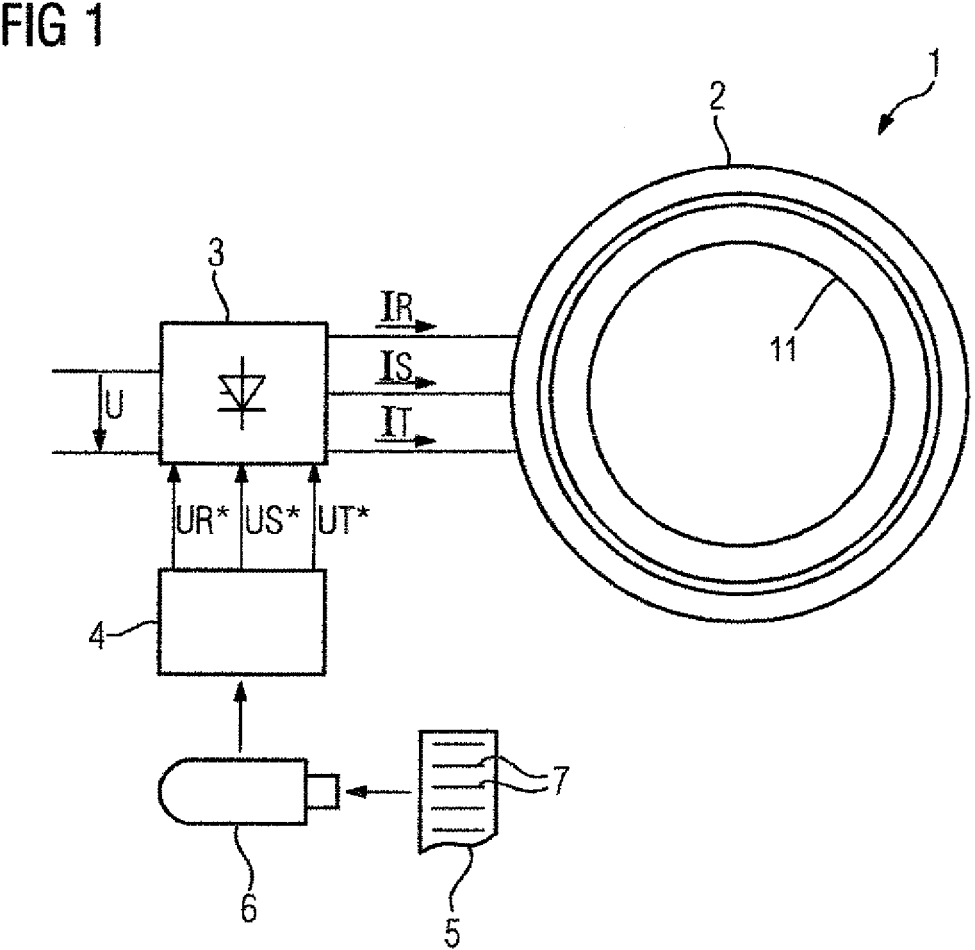
FIG. 1 is a diagram of a poly-phase electric machine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an electric machine 1 having a first active part 2 which is connected to a three-phase supply voltage U by a converter 3 which supplies the first active part 2 with the three-phase electric currents IR, IS, IT. The poly-phase system provided in accordance with the invention is usually a three-phase system. In exceptional cases, however, four or five phases may be provided.

The converter 3 is controlled by a control facility 4 that is operated by a computer program 5. The computer program 5 can be supplied to the control facility 4 by way of a data carrier 6, such as the USB memory stick 6 that is shown in FIG. 1 purely as one example of a data carrier, without limitation thereto. The computer program 5 comprises machine code 7 adapted to be processed by the control facility 4. The processing of the machine code 7 causes the control facility 4 to control the converter 3 in accordance with the method of the invention, which is explained in more detail below in conjunction with subsequent Figures.

Figure 2:
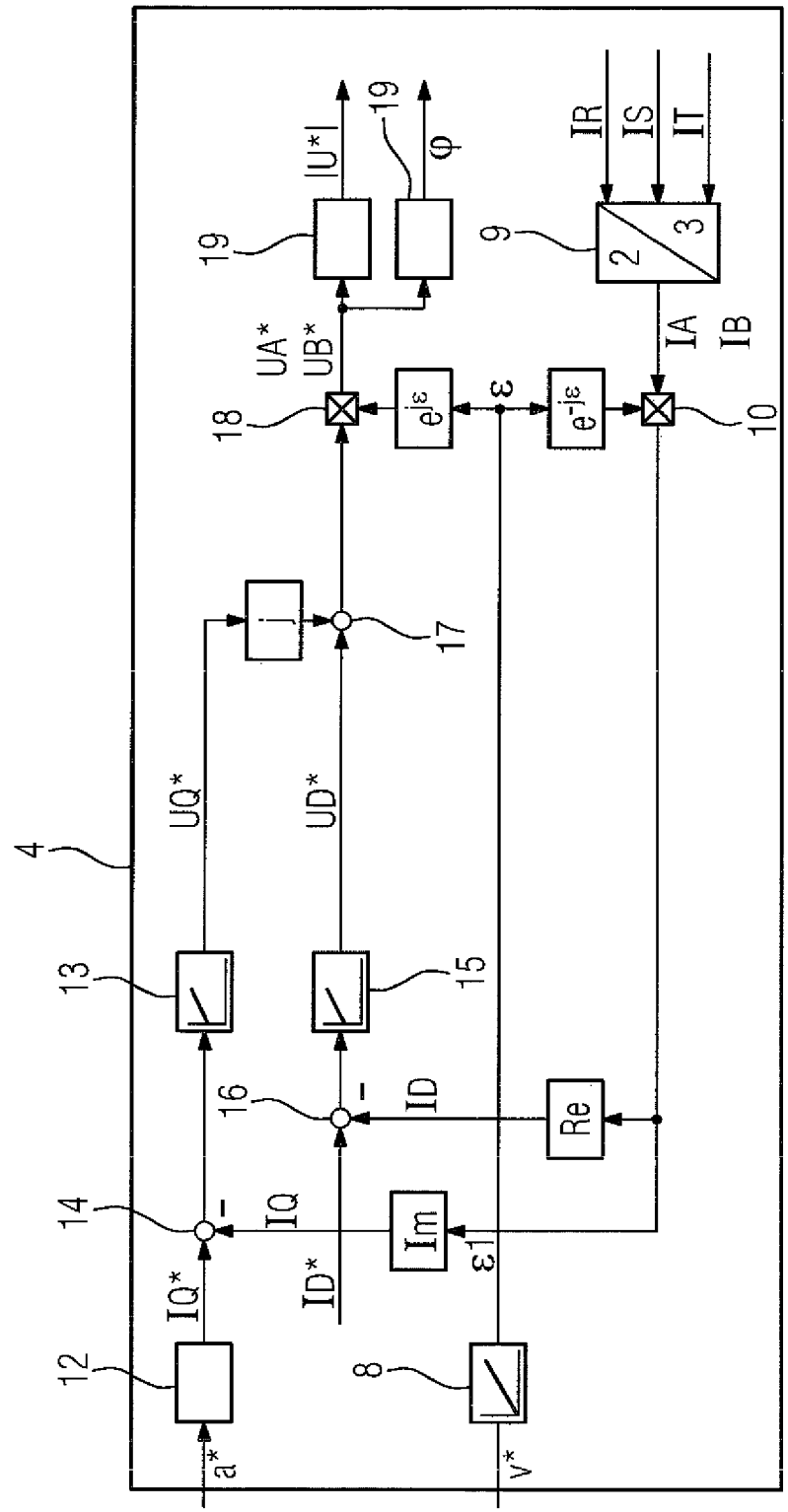
FIG. 2 is a circuit diagram of a prior art control facility of a converter.
Figure 3:
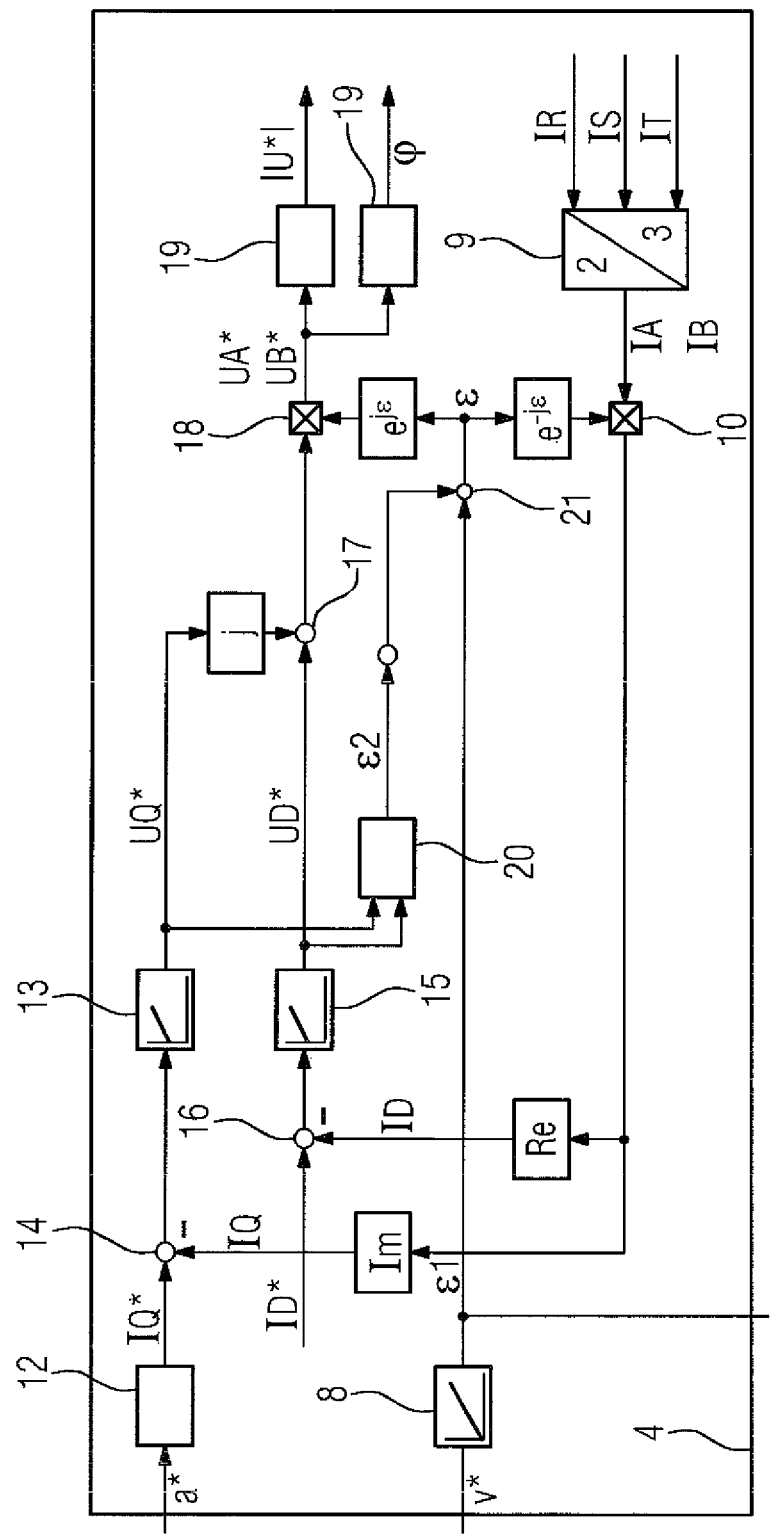
FIG. 3 is a circuit diagram of an inventive control facility.

In FIG. 2, a target speed value v* is provided to an integrator 8 in the control facility 4. The control facility 4 updates a base commutation angle $\epsilon 1$ using the target speed value v* and the integrator 8. The base commutation angle $\epsilon 1$ here corresponds to a commutation angle $\epsilon$. In FIG. 3, in contrast, the base commutation angle $\epsilon 1$ and the commutation angle are distinct, in accordance with the invention.

In FIG. 2, the electric currents IR, IS, IT of the three-phase system provided to the converter 3 controlled by the control facility 4 are detected by sensors and supplied to the control facility 4. The detected electric currents IR, IS and IT are then supplied to a determination block 9 that converts them into orthogonal current components IA, IB. The orthogonal current components IA, IB are supplied by the converter to the first active part 2 or to the converter 3. This is a conventional conversion that is commonly used and generally known to persons skilled in the art.

In FIG. 2, the control facility 4 determines a direct-axis component of the current ID and a quadrature-axis component of the current IQ on the basis of the orthogonal current components IA, IB and the commutation angle $\epsilon$. For this purpose, the orthogonal current components IA, 1B are combined to form a complex variable (current space vector) and are supplied in this form to a multiplier 10. The current component IA corresponds to the real part of the complex variable; the current component IB, to the imaginary part of the complex variable. The complex value $e^{-j\epsilon}$ is also supplied to the multiplier 10. The multiplier 10 performs the (complex) multiplication. The result of the complex multiplication is a further complex variable, the real and imaginary parts of which correspond to the direct-axis component of the current ID and the quadrature-axis component of current IQ. The two currents ID, IQ are thus likewise orthogonal to one another. They are however supplied to a second active part 11 of the electric machine 1 shown in FIG. 1. This conversion is also known to persons skilled in the art and commonly used.

During controlled operation, the determined currents ID, IQ do not necessarily actually correspond in the strictest sense to the real electric currents supplied to the second active part 11. Thus, for a precise calculation, the position of the second active part 11 relative to the first active part 2 must then be known, but this is not the case. However, in practice, the inventive method disclosed below provides correct operation of the electric machine 1.

The second active part 11 interacts with the first active part 2. That is, the two active parts 2, 11 can be moved relative to one another. In the case of a rotary electric machine 1, the first active part 2 is generally the stator, and the second active part 11 to the rotating element or rotor of the electric machine 1. In the case of a linear electric drive, the first active part 2 corresponds to the primary part, and the second active part 11 to the secondary part of the linear drive.

The control facility 4 supplies a target quadrature-axis component of current value IQ* and the quadrature-axis component of current IQ to a quadrature-axis component of current controller 13. In particular, the difference between the target quadrature-axis component of current value IQ* and the quadrature-axis component of current IQ can firstly be formed in a node point 14 and this difference can be supplied to the quadrature-axis component of current controller 13. The quadrature-axis component of current controller 13 determines a target quadrature-axis component of voltage value UQ* from the target quadrature-axis component of current value IQ* and the quadrature-axis component of current IQ. It is possible for the target quadrature-axis component of current value IQ* of the control facility 4 to be known in advance, for instance constantly having the value zero. Alternatively the target quadrature-axis component of current value IQ* of the control facility 4 can be predefined from the outside or derived by the control facility 4 from the target speed value v*. It is in turn alternatively possible for a target acceleration value a* to also be predefined to the control facility 4, in addition to the target speed value v*. In this case the control facility 4 determines the target quadrature-axis component of current value IQ* in a further determination block 12 in a manner known per se on the basis of the target acceleration value a*.

The control facility 4 similarly supplies a target direct-axis component of current value ID* and the direct-axis component of current ID to a direct-axis component of current controller 15. In particular, the difference between the target direct-axis component of current value ID* and the direct-axis component of current ID can firstly be formed in a node point 16 and this difference can be supplied to the direct-axis component of current controller 15. The direct-axis component of current controller 15 determines a target direct-axis component of voltage value UD* from the target direct-axis component of current value ID* and the direct-axis component of current ID. The target direct-axis component of current value ID* can be defined as required.

The quadrature-axis component of current controller 13 can be embodied as required, as a PI controller for instance. The direct-axis component of current controller 15 can similarly also be embodied as required, as a PI controller for instance. The quadrature-axis component of current controller 13 and the direct-axis component of current controller 15 are generally embodied similarly and parameterized in the same way.

On the basis of the target direct-axis component of voltage value UD*, the target quadrature-axis component of voltage value UQ* and the commutation angle ε, the control facility 4 determines data which is characteristic of voltages UR*, US*, UT* of a three-phase voltage system. The voltages UR*, US*, UT* are those voltages which are to be output by the converter 3 to the first active part 2.

In FIG. 2, in order to determine the characteristic data, the target direct-axis component of voltage value UD* and the target quadrature-axis component of voltage value UQ* are supplied to a further node point 17. Before supplying the node point 17, the target quadrature-axis component of voltage UQ* value is multiplied with the imaginary unit j. Thus the signal output by the node point 17 is a complex variable in which the real part corresponds to the target direct-axis component of voltage value UD* and the imaginary part corresponds to the target quadrature-axis component of voltage value UQ* (a voltage-space vector). The complex variable determined at the node point 17 is supplied to a multiplier 18. The complex value $e^{-j\epsilon}$ is also supplied to that multiplier 18, which provides a complex-number multiplication that produces a further complex variable. The real and imaginary part of the complex variable thus produced correspond to the orthogonal voltage components UA*, UB*, respectively. However they are not supplied to the second active part 11, but instead to the first active part 2. This conversion is also known to persons skilled in the art and is commonly used.

The voltage components UA*, UB* are already characteristic of the voltages UR*, US*, UT*, which have to be output by the converter 3 to the first active part 2. It is therefore possible for the control facility 4 to predefine the voltage components UA*, UB* that are output by the converter 3.

A determination of other characteristic data is likewise also possible. In particular, the control facility 4 can perform a conversion of the magnitude and phase position ϕ of the voltage components UA*, UB* of the voltage U* to be output using a determination block 19. This data is also characteristic of the voltages UR*, US*, UT* output by the converter 3 to the first active part 2. It is also possible for the control facility 4 itself to directly determine these voltages UR*, US*, UT* provide that determination to the converter 3. These two conversions are also known to persons skilled in the art and are commonly used.

The characteristic data, that is, the voltage components UA*, UB* or the magnitude and the phase position ϕ of the voltage U* or the voltages UR*, US*, UT* themselves, are thus predefined for the converter 3 by the control facility 4 in FIG. 2.

The procedure explained above with reference to FIG. 2 is generally known as such to persons skilled in the art. During controlled operation, the target quadrature-axis component of current value IQ* is generally fixed to the value 0 or pre-controlled according to a predefined function. Generally it is also sufficient for the target direct-axis component of voltage value ID*, if it is predefined as sufficiently large, to incidentally be kept constant. The target quadrature-axis component of current value IQ* can be specified explicitly, or be defined either as a function of the target acceleration value a* or by the "controlled operation" operating mode.

FIG. 3 shows essentially the same components as in FIG. 2 but, in addition, a vibration damping block 20 and a node point 21 are also present. According to FIG. 3, the target direct-axis component of voltage value UD* and the target quadrature-axis component of voltage value UQ* are supplied to the vibration damping block 20. The control facility 4 then uses the vibration damping block 20 to determine a damping commutation angle ε2. The damping commutation angle ε2 is determined using both the target value of the direct-axis component of the voltage UD* and also the target value of the quadrature-axis component of voltage UQ*.

This determination, is counteracts a mechanical vibration that otherwise overlies the desired movement of the second active part 11 relative to the first active part 2. The desired movement of the two active parts 2, 11 is defined by the target speed value v*. At node point 21, the control facility 4 sums the base commutation angle $\epsilon 1$ and the damping commutation angle $\epsilon 2$. That summation produces the commutation angle $\epsilon$.

Figure 4:
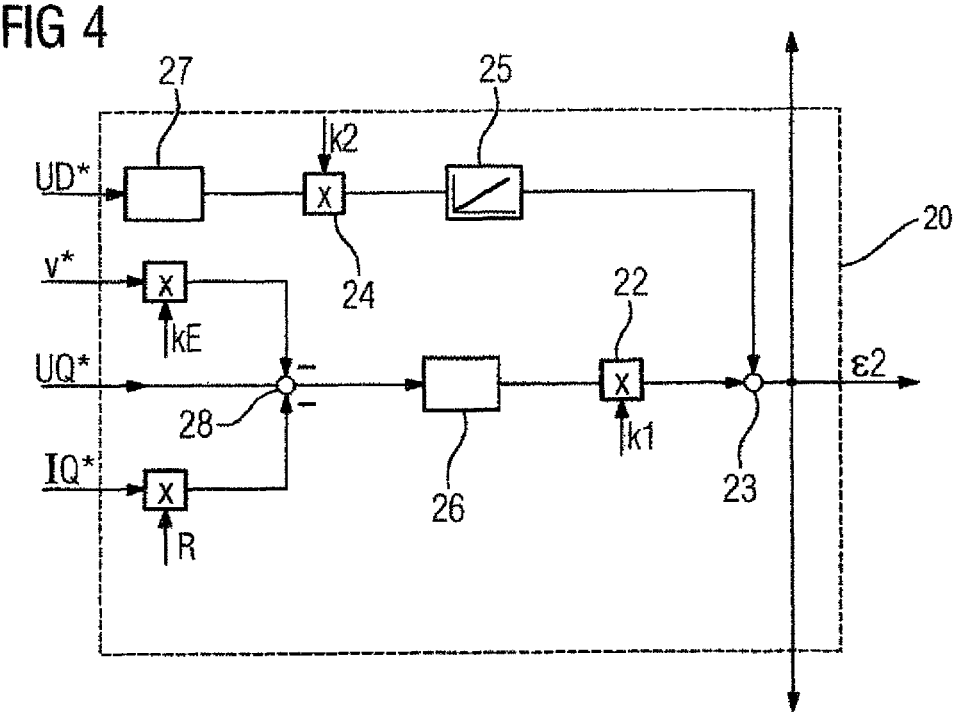
FIG. 4 is a circuit diagram of an inventive vibration damping block.

FIG. 4 shows a preferred embodiment of the vibration damping block 20. According to FIG. 4, the target quadrature-axis component of voltage value UQ* is weighted by being multiplied by a first coefficient k1 in a multiplier 22 and then used to determine the damping commutation angle $\epsilon 2$ at a node point 23. A variable determined using the target direct-axis component of voltage value UD* that is weighted in a multiplier 24 by a second coefficient k2 and processed by the integrator 25 is also supplied to the node point 23. These two variables are summed at the node point 23 to determine the damping commutation angle $\epsilon 2$.

The target quadrature-axis component of voltage value UQ* is preferably processed by a filter 26. This filtering can take place either prior to or after being weighted by the first coefficient k1. Also, the target direct-axis component of voltage value UD* is preferably processed by the filter 27 prior to integration. Alternatively, this filtering can take place either prior to or after being weighted by the second coefficient k2.

The filters 26, 27 can be configured as required. In particular, they may be band-pass filters configured to remove respective DC components from the target voltage value signals UD*, UQ*. Other disturbance variables can also be filtered out from the respective signal.

In a further feature of FIG. 4, the target speed value v* is preferrably also supplied to the vibration damping block 20. This target speed value v* is preferably also used by the vibration damping block 20 to determine the damping commutation angle $\epsilon 2$. In FIG. 4 this target speed value v* is weighted by a first characteristic coefficient kE and the result of the weighting in a node point 28 is subtracted from the target quadrature-axis component of voltage value UQ*. The first characteristic coefficient kE is preferably determined by electrical characteristics of the first active part 2.

Alternatively or in addition, preferably in addition, the target quadrature-axis component of current value IQ* can also be supplied to the vibration damping block 20. In this case, the vibration damping block 20 uses the target value of the quadrature-axis component of the current IQ* to determine the damping commutation angle $\epsilon 2$. For instance, in FIG. 4, the target value of the quadrature-axis component of the current IQ* is weighted by a second characteristic coefficient R and then subtracted from the target value of the quadrature-axis component of the voltage UQ* for instance. The second characteristic coefficient R can be determined by the winding resistance of the first active part 2, in particular it can match that resistance.

Figure 5:
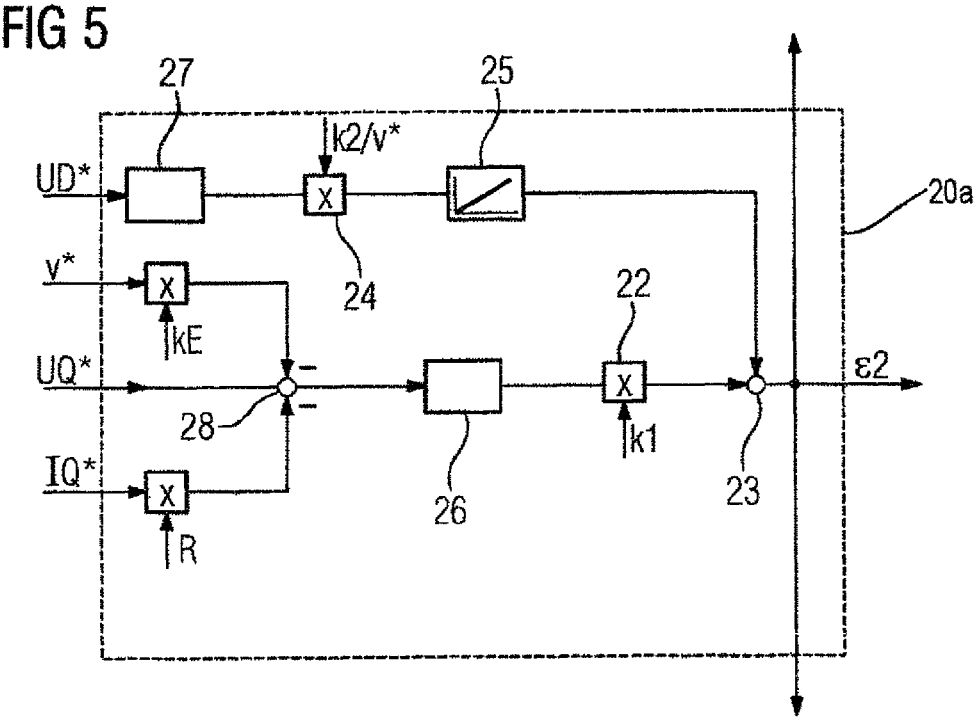
FIG. 5 is a circuit diagram of a modified inventive vibration damping block.

FIG. 5 shows a modified version 20a of the vibration damping block 20 shown in FIG. 4. In FIG. 5, k2/v* is the weighting coefficient supplied to the multiplier 24. Thus, the target value of the direct-axis component of the voltage value UD* is weighted with the second coefficient k2, but this is divided by the target speed value v* and only the result of that weighting is processed by the integrator 25. As in FIG. 4, the target value of the direct-axis component of voltage value UD* can also be filtered, but in this case that filtering takes place prior to the division by the target speed value v*.

In summary, in accordance with the present invention, a first active part 2 of an electric machine is connected by a converter 3 having a control facility 4 to a poly-phase supply voltage U. The converter supplies electric currents IR, IS, IT to the machine 1 from a three-phase system. A predefined target speed value v* is provided to the control facility 4. Using the target speed value v*, the control facility 4 updates a base commutation angle $\epsilon 1$. Using the electric currents IR, IS, IT of the three-phase system and a commutation angle $\epsilon$, it also determines a direct-axis component of the current ID and a quadrature-axis component of the current IQ, which are both supplied to a second active part 11 of the electric machine. The control facility 4 supplies a target value of the quadrature-axis component of the current IQ* and also a quadrature-axis component of current IQ to a quadrature-axis current controller 13, which determines a target value of the quadrature-axis component of the voltage UQ* therefrom. The control facility 4 provides a target value of the direct-axis component of the current ID* and the direct-axis component of current ID to a direct-axis current controller 15, which determines a target value of the direct-axis component of the voltage UD* therefrom. The control facility 4 provides the target value of the direct-axis component of the voltage UD*, of the quadrature-axis component of the voltage UQ*, and the commutation angle $\epsilon$ data that is characteristic of the voltages UR*, US*, UT* of the three-phase system, which are to be output by the converter 3 to the first active part 2 of the machine 1, to the converter 3. The control facility 4 determines the commutation angle $\epsilon$ using the base commutation angle $\epsilon 1$ and a damping commutation angle $\epsilon 2$, which it determines using both the target value of the quadrature-axis component of the voltage UQ* and also the target direct-axis component of voltage value UD*.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A control method for a converter connected to an electric machine having a first active part and a second active part that interacts with the first active part, the first active part of the electrical machine being connected to a poly-phase power source providing a supply voltage and respective poly-phase currents by the converter, said converter having a control facility connected to control the converter, said method comprising the steps of:

providing a predetermined target speed value to the control facility of the converter;

the control facility of the converter updating a base commutation angle using the target speed value;

the control facility determining the values of the direct-axis and quadrature-axis components of the current provided to the second active part of the electric machine that interacts with the first active part by the converter, the control facility of the converter using the values of the currents provided by the poly-phase system and a commutation angle;

the control facility determining a damping commutation angle using the target values of the direct-axis component and the quadrature-axis component of the voltage;

the control facility determining the commutation angle using the base commutation angle and the damping commutation angle;

the control facility providing the commutation angle to the converter;

the control facility using the target values of the direct-axis and the quadrature-axis components of the voltage and the commutation angle of the voltage provided to the first active part of the electric machine by the converter to determine data characteristic of poly-phase voltage system voltages supplied to the first active part and supply that characteristic data to the converter;

the control facility determining the target value of the quadrature-axis voltage by supplying the target value of the quadrature-axis component of the current and the value of the quadrature-axis component of the current to a quadrature-axis portion of a current controller of the control facility; and the control facility determining the target value of the direct-axis component of the voltage by supplying the target value of the direct-axis component of the current and the value of the direct-axis component of the current to a direct-axis portion of a current controller of the control facility.

2. The control method of claim 1, further comprising:
the control facility weighting the target value of the quadrature-axis component of the voltage using a first weighting coefficient; and
using the weighted form of the target value of the quadrature-axis component of the voltage to determine the damping commutation angle.

3. The control method of claim 2, further comprising:
the control facility filtering the target value of the quadrature-axis component of the voltage prior to or after the weighting.

4. The control method of claim 1, further comprising:
the control facility weighting the target value of the direct-axis component) of the voltage using a second coefficient,
integrating the weighted target value of the direct-axis component of the voltage, and
using the integrated weighted target value of the direct-axis component of the voltage to determine a damping commutation angle.

5. The control method of claim 4, further comprising:
the control facility filtering the target value of the direct-axis component of the voltage prior to the integration.

6. The control method of claim 1, further comprising:
the control facility using a target speed value for determining the damping commutation angle.

7. The control method of claim 6, further comprising:
the control facility weighting the target speed value using a first characteristic coefficient, and
determining the damping commutation angle by subtracting the result of weighting the target speed value with a weighted first characteristic coefficient from the value of the quadrature-axis component of the voltage.

8. The control method of claim 6, further comprising:
the control facility weighting the target value of the direct-axis component of the voltage using a second weighting coefficient,
dividing the result of weighting the target value of the direct-axis component of the voltage using the second weighting coefficient by the target speed value; and determining the damping commutation angle by integrating the result of dividing the weighted target value of the direct-axis component of the voltage by the target speed value.

9. The control method of claim 8, further comprising:
the control facility filtering the target value of the direct-axis component of the voltage prior to dividing the target value of the direct-axis component of the voltage by the target speed value.

10. The control method of claim 1, further comprising:
the control facility determining the damping commutation angle using the target value of the quadrature-axis component of the current.

11. The control method of claim 10, further comprising:
the control facility weighting the target value of the quadrature-axis component of the current value using a second characteristic coefficient; and
subtracting the weighted target value of the quadrature-axis component of the current value from the target value of the quadrature-axis component of the voltage.

12. The control method of claim 1, further comprising:
providing a target acceleration value to the control facility, the control facility determining the target quadrature-axis component of the current value using the target acceleration value.

13. The control method of claim 1, configured for use in a rotary electric machine or in an electric linear drive.

14. A computer program having machine code configured to be processed by a control facility of a converter having a poly-phase power source, the processing of the computer program providing machine code causing the control facility to operate the converter using a control method in accordance with the invention, said computer program comprising:

machine code configured to provide predetermined target values of direct-axis and quadrature-axis components of the current and a predetermined target speed value to the control facility, and to update a base commutation angle using the target speed value;

machine code configured to determine the values of direct-axis and quadrature-axis components of the current provided to the second active part of the of the electric machine by the converter, the control facility of the converter using the values of the currents provided by the poly-phase system and a commutation angle;

machine code configured to determine a damping commutation angle using the target values of the direct-axis and quadrature-axis components of the voltage;

machine code configured to determine the commutation angle using the base commutation angle and the damping commutation angle and to provide the commutation angle to the converter;

machine code configured to use the target values of the direct-axis and quadrature-axis components of the voltage and the commutation angle of the voltage provided to the first active part of the electric machine by the converter to determine data characteristic of poly-phase voltage system voltages that are supplied to the first active part, and supply that characteristic data to the converter;

machine code configured to determine the target value of the quadrature-axis voltage by supplying the target value of the quadrature-axis component of the current and the value of the quadrature-axis component of the current to a quadrature-axis portion of a current controller of the control facility; and machine code configured to determine the target value of the direct-axis component of the voltage by supplying the target value of the direct-axis component of the current and the value of the direct-axis component of the current to a direct-axis portion of a current controller of the control facility.

15. A control facility adapted to control a converter having a poly-phase power source, said control facility comprising:
   a computer program processor adapted to execute machine code provided by a computer program; and
   a computer program adapted to provide machine code including:
   machine code configured to provide predetermined target values of direct-axis and quadrature-axis components of the current and a predetermined target speed value to the control facility, and to update a base commutation angle using the target speed value;
   machine code configured to determine the values of direct-axis and quadrature-axis components of the current provided to the second active part of the of the electric machine by the converter, the control facility of the converter using the values of the currents provided by the poly-phase system and a commutation angle;
   machine code configured to determine a damping commutation angle using the target values of the direct-axis and quadrature-axis components of the voltage;
   machine code configured to determine the commutation angle using the base commutation angle and the damping commutation angle and to provide the commutation angle to the converter;
   machine code configured to determine the target values of the direct-axis and quadrature-axis components of the voltage, using the target values of the direct-axis and quadrature-axis components of the current and the commutation angle provided to the first active part of the electric machine by the converter;
   machine code configured to determine the target value of the quadrature-axis voltage by supplying the target value of the quadrature-axis component of the current and the value of the quadrature-axis component of the current to a quadrature-axis portion of a current controller of the control facility; and
   machine code configured to determine the target value of the direct-axis component of the current voltage by supplying the target value of the direct-axis component of the current and the value of the direct-axis component of the current to a direct-axis portion of a current controller of the control facility.

16. A poly-phase electric machine, comprising:
   a converter adapted to be connected to a poly-phase electric power source;
   a first active part and a second active part connected to the converter; and
   a control facility connected to control the converter, the control facility having a control program comprising machine code, said control program being adapted to be executed by the control facility, said control program including:
   machine code configured to provide predetermined target values of direct-axis and quadrature-axis components of the predetermined poly-phase current and a predetermined target speed value to the control facility, and to update a base commutation angle using the target speed value;
   machine code configured to determine the values of the direct-axis and the quadrature-axis components of the current provided to the second active part of the electric machine that interacts with the first active part by the converter, the control facility of the converter using the values of the currents provided by the poly-phase system and a commutation angle;
   machine code configured to determine a damping commutation angle using the target values of the direct-axis component and the quadrature-axis component of the voltage;
   machine code configured to determine the commutation angle using the base commutation angle and a damping commutation angle, and to provide the commutation angle to the converter;
   machine code configured to determine the target value of the quadrature-axis component of the voltage by supplying the commutation angle of the voltage provided to the first active part of the electric machine by the converter, using the target values of the direct-axis and quadrature-axis components of the voltage;
   machine code configured to determine the target value of the direct-axis component of the current voltage by supplying the target value of the direct-axis component of the current and the value of the direct-axis component of the current to a direct-axis portion of a current controller of the control facility; and
   machine code configured to determine the target value of the quadrature-axis voltage by supplying the target value of the quadrature-axis component of the current and the value of the quadrature-axis component of the current to a quadrature-axis portion of a current controller of the control facility.

17. The electric machine of claim 16, wherein the first and second active parts of the electric machine comprise a rotary electric drive or a linear electric drive.

* * * * *